US005731574A

United States Patent [19]

Bodie et al.

[11] Patent Number: 5,731,574

[45] Date of Patent: Mar. 24, 1998

[54] DIGITAL POSTAGE INDICIA VERIFICATION FOR INSERTING SYSTEM

[75] Inventors: Kevin W. Bodie, Bethel; Neale C. Hutcheson, New Canaan, both of Conn.

[73] Assignee: Pitney Bowes Inc., Stamford, Conn.

[21] Appl. No.: 722,686

[22] Filed: Sep. 30, 1996

[51] Int. Cl.$^{6}$ .................................................. G06F 17/00

[52] U.S. Cl. ........................................ 235/375; 235/494

[58] Field of Search ................................. 235/375, 494

[56] References Cited

U.S. PATENT DOCUMENTS 4,800,504 1/1989 Durst, Jr. et al. ....................... 235/375

*Primary Examiner*—Harold Pitts
*Attorney, Agent, or Firm*—Christopher Capelli; Melvin J. Scolnick; Robert Meyer

[57] ABSTRACT

In an envelope inserting system, a method of digitally printing a postage indicia including a barcode on an envelope. The method includes: inserting a plurality of documents into an envelope to form a stuffed envelope; conveying the stuffed envelope to a digital, postage indicia printer; conveying an image of the postage indicia and included barcode to the printer; printing a postage indicia and included barcode on the stuffed envelope with the postgae indicia printer; conveying the printed, stuffed envelope to a barcode reader; determining with the barcode reader whether or not the barcode is readable; if the barcode is readable, determining whether or not the indicia was printed with the correct amount of postage; and if the barcode is not readable or if the indicia was not printed with the correct amount of postage, outsorting the stuffed envelope.

6 Claims, 2 Drawing Sheets

DIGITAL POSTAGE INDICIA VERIFICATION FOR INSERTING SYSTEM

BACKGROUND OF THE INVENTION

The instant invention relates to envelope inserting systems and more particularly to such systems which print digital indicias on the envelopes.

Inserting systems are well known for feeding and collating documents and then inserting the collated documents into an envelope. Such inserting systems also print the appropriate postage onto the envelope in the form of an indicia. The U.S. Postal Service is presently in the process of issuing a new standard for digital postal indicias which include a barcode. Clearly for the new postal indicias to help speed the process of handling mail and improve efficiencies, it will be necessary for envelopes to have the proper amount of postage printed. If no postage or incorrect postage is printed, speed and efficiency are lost. Thus, a system is needed for an inserting system which will verify that the correct amount of postage was printed on the envelope. There are printers available today which provide verification of the amount of postage printed. However, the objective of the U.S. Postal Service is to have all mail addresses be machine readable, and their new, proposed PDF-417, two dimensional barcode is designed for that objective. The problem with the verifying printers available today is that although they can verify whether or not the correct amount of postage was printed, they cannot verify that the print quality of the barcode is sufficient to be read by U.S. Postal service scanning apparatus because such printers lack any scanning capability.

The instant invention therefor provides a system which will verify that an envelope printed with a digital postage indicia having a barcode was printed with the correct amount of postage and additionally will verify that the print quality of the barcode is machine readable by U.S. Postal Service scanning apparatus.

SUMMARY OF THE INVENTION

Accordingly, the instant invention provides, in an envelope inserting system, a method of digitally printing a postage indicia including a barcode on an envelope. The method includes: inserting a plurality of documents into an envelope to form a stuffed envelope; conveying said stuffed envelope to a digital, postage indicia printer; conveying an image of the postage indicia and included barcode to said printer; printing a postage indicia and included barcode on said stuffed envelope with said postage indicia printer; conveying said printed, stuffed envelope to a barcode reader; determining with said barcode reader whether or not said barcode is readable; if said barcode is readable, determining whether or not the indicia was printed with the correct amount of postage; and if said barcode is not readable or if the indicia was not printed with the correct amount of postage, outsorting said stuffed envelope.

DETAILED DESCRIPTION OF THE PREFERRED EMBODIMENT

Figure 1:
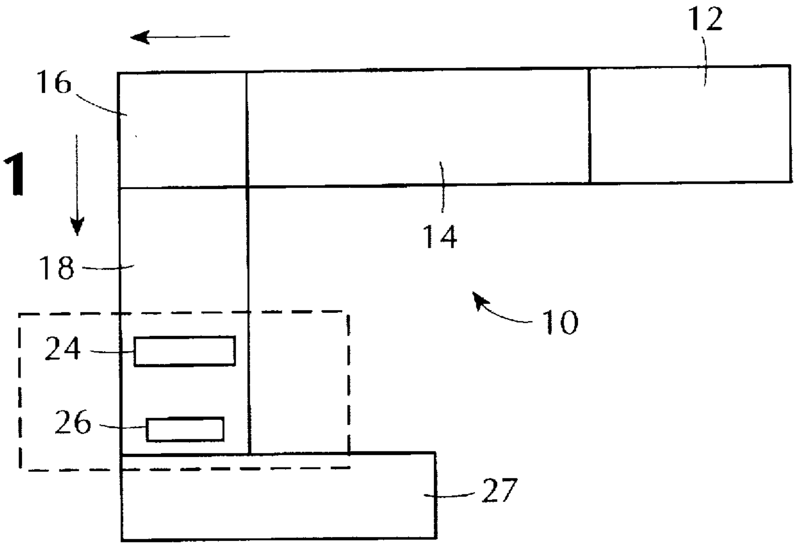
FIG. 1 is a schematic, top, plan view of an inserting system having a postage printing system in accordance with the instant invention.

In describing the preferred embodiment of the instant invention, reference is made to the drawings, wherein there is seen in FIG. 1 an inserting system generally designated 10 having an input module 12, a chassis 14 having a plurality of feeders and an inserting station (not shown) downstream of the feeders, and a right angle turner 16, all of which are conventional and thus will not be discussed in any further detail. Downstream of the right angle turner 16 is a modular output system generally designated 18, including, inter alia, a conveying deck 20 (see FIG. 2) for conveying a plurality of envelopes **22*a*, 22*b* and 22*c* past a digital indicia printer 24 and a PDF-417, non-contact, barcode reader 26. The modular output system 18 also includes a power stacker 27 for stacking the imprinted envelopes 22**.

Figure 3:
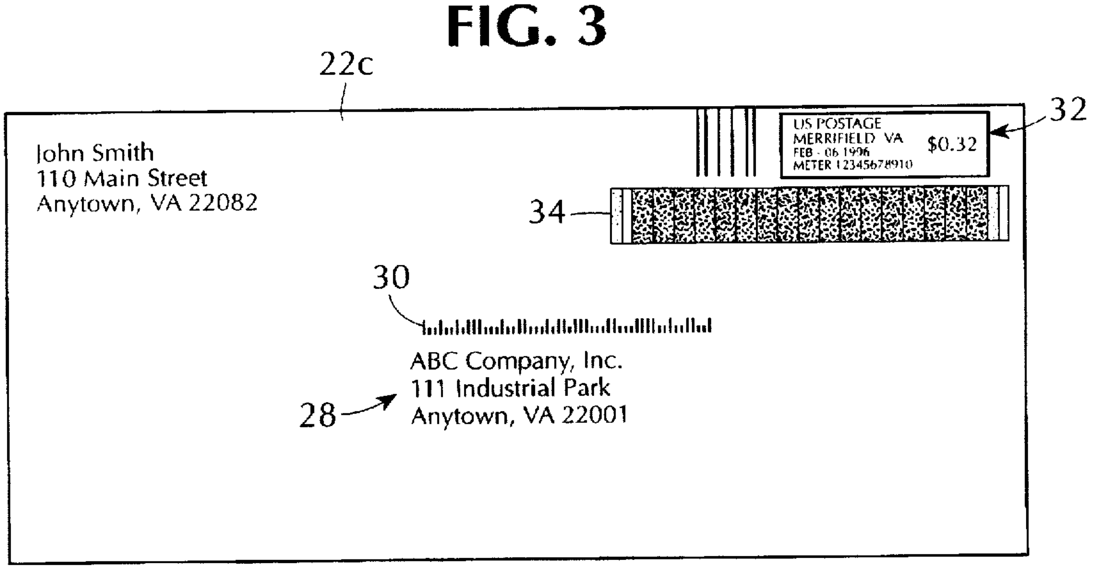
FIG. 3 is a top, plan view of an envelope having a new, digital postage indicia with a PDF-417, two dimensional barcode.

The envelope **22*c* seen in FIG. 3 includes an address 28 and associated Postnet barcode 30 of the address and a digital postage indicia 32 which includes a PDF-417 barcode 34, which is two-dimensional. The barcode 34** includes, in its format, the amount of postage to be printed.

Figure 4:
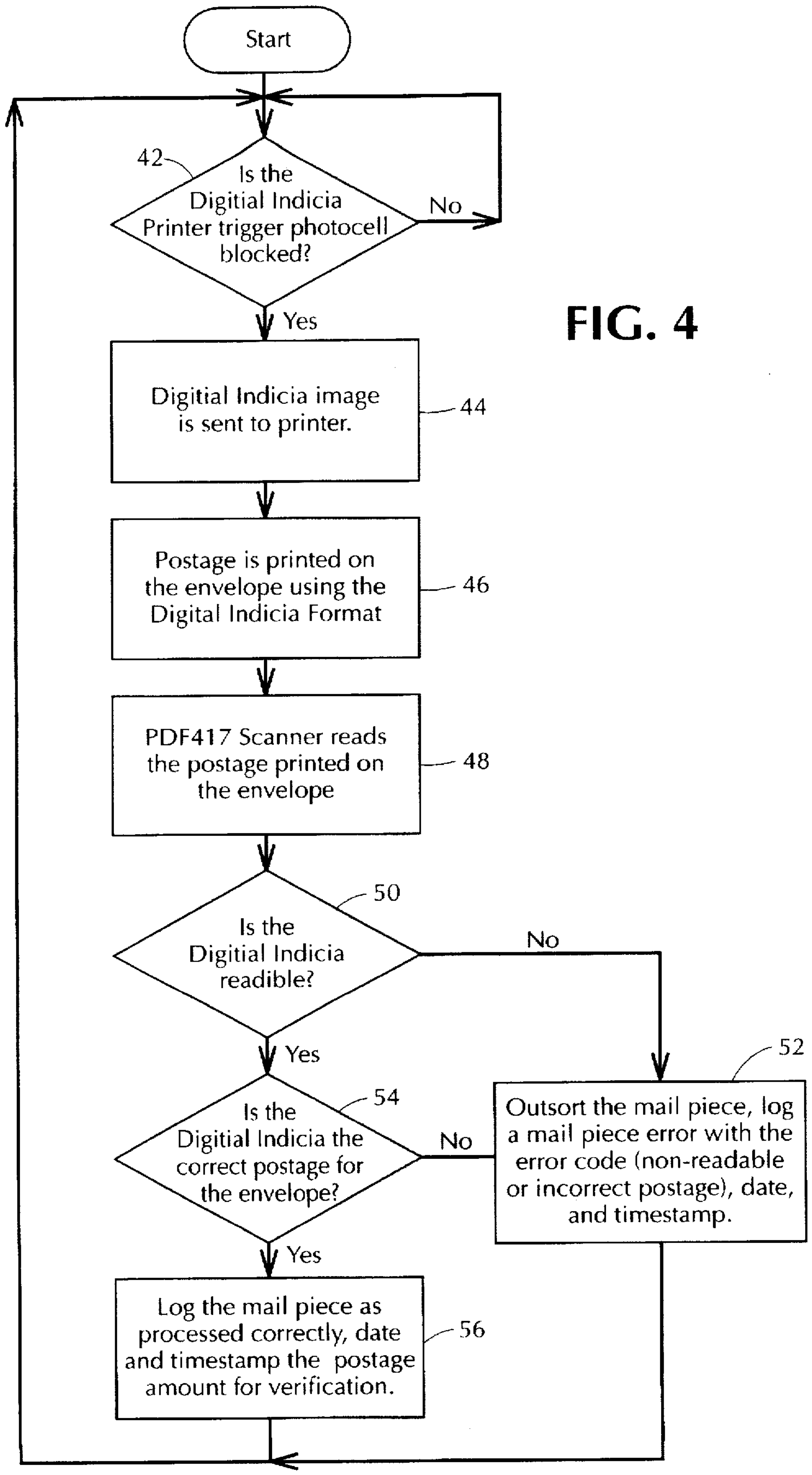
FIG. 4 is a flow chart for the printing apparatus seen in FIG. 2.

The operation of the inserting system 10, and the printer 24 and the barcode reader 26 with reference to the flow chart seen in FIG. 4, will now be described. The input module 12 feeds discrete sheets of paper which have been cut or burst from a web to the chassis 14 which has a conveying deck (not shown) for receiving insert material (not shown) from the chassis feeders (not shown). The discrete sheets and the insert material are conveyed downstream to the inserting station where they are inserted into a waiting envelope, such as envelope **22*c* seen in FIG. 3. The stuffed envelope's path of travel is then changed by 90 degrees by the right angle turner 16 and the stuffed envelope is then conveyed to the postal indicia printer 24**.

Figure 2:
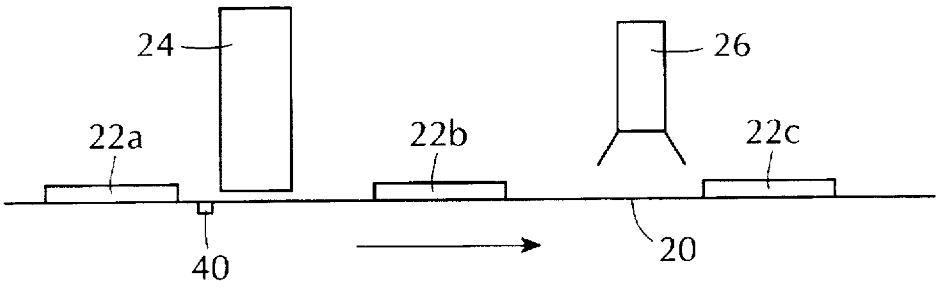
FIG. 2 is a schematic, side, elevational view showing the printing section of the inserting system seen in FIG. 1 within the dashed lines.

The operation of the printer 24 and the barcode reader 26 will now be described with particular reference to FIG. 2 and the flow chart seen in FIG. 4. The envelope **22*a*, seen in FIG. 2, is conveyed from the modular output system 18 and covers the data-to-printer photocell 40 as indicated in block 42. At this point the image for the digital indicia 32 and included barcode 34 is sent to the printer 24 from an output within the inserting system 10 as indicated in block 44. The image is a bit-mapped image or a string containing the information which will be converted into the indicia 32 and the included PDF-417 barcode 34. The envelope 22*a* then passes under the printer 24 and the digital indicia 32 and the included barcode 34 are printed in the upper, right corner of the envelope 22, as indicated by block 46. The printer 24 may or may not employ some type of feedback verification. This kind of flexibility in the instant invention allows any type of printer 24** to be used, provided the print resolution and speed are adequate.

Referring to FIG. 2, the envelope **22*b* represents an envelope with a printed indicia 32 and included barcode 34 traveling toward the barcode reader 26. As the envelope 22*b* passes under the reader 26, the reader 26, by reading the barcode 34, reads the amount of postage printed in the barcode 34 on the envelope 22*b*, which FIG. 3 is shown as $.32, as indicated in block 48. The reader 26 first determines if the PDF-417 barcode 34** is readable, as indicated in block 50. If the barcode 34 is not readable, the envelope 22 is outsorted, and the reader 26 logs a mail piece error with an error code for non-readable barcode, and dates and timestamps the envelope 22c, as indicated in block 52. If the barcode 34 is readable, the reader 26 determines if the indicia 32 contains the correct postage for the envelope, as indicated in block 54. If the indicia 32 is printed with the incorrect amount of postage, the envelope 22 is outsorted and the reader 26 logs a mail piece error with an error code for incorrect postage, and dates and timestamps the envelope 22c, as indicated in block 52. If the indicia 32 is printed with the correct amount of postage, the reader 26 logs the envelope 22c as processed correctly, and dates and timestamps the envelope 22c for verification, as indicated in block 56.

From the foregoing description, it can be seen that the instant invention provides a high level of integrity to all mail passing through the inserting system 10. The instant invention assures that all envelopes with incorrect or non-postage, or having a barcode without sufficient quality to be read by U.S. Postal Service scanning apparatus do not reach an output stacker and thus can be outsorted.

It should be understood by those skilled in the art that various modifications may be made in the present invention without departing from the spirit and scope thereof, as described in the specification and defined in the appended claims.

What is claimed is:

1. In an envelope inserting system, a method of digitally printing a postage indicia including a barcode on an envelope, comprising:

inserting a plurality of documents into an envelope to form a stuffed envelope;

conveying said stuffed envelope to a digital, postage indicia printer;

conveying an image of the postage indicia and included barcode to said printer;

printing a postage indicia and included barcode on said stuffed envelope with said postage indicia printer;

conveying said printed, stuffed envelope to a barcode reader;

determining with said barcode reader whether or not said barcode is readable;

if said barcode is readable, determining whether or not the indicia was printed with the correct amount of postage; and if said barcode is not readable or if the indicia was not printed with the correct amount of postage, outsorting said stuffed envelope.

2. The method of claim 1, wherein said barcode is two dimensional.

3. The method of claim 2, wherein said barcode comprises PDF-417 barcode.

4. The method of claim 3, wherein said barcode reader comprises a PDF-417, non-contact barcode reader.

5. The method of claim 4, wherein said image comprises a bit-mapped image.

6. The method of claim 5, wherein said printer includes a type of feedback verification.

* * * * *